United States Patent
Xu et al.

(10) Patent No.: US 9,678,614 B2
(45) Date of Patent: Jun. 13, 2017

(54) TOUCH DISPLAY PANEL, DETECTING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Lei Wang, Beijing (CN); Yanchen Li, Beijing (CN); Xi Chen, Beijing (CN); Yingming Liu, Beijing (CN); Shengji Yang, Beijing (CN); Zhiying Bao, Beijing (CN); Yue Li, Beijing (CN); Zhenhua Lv, Beijing (CN); Weijie Zhao, Beijing (CN); Hailin Xue, Beijing (CN)

(73) Assignees: Boe Technology Group Co., Ltd., Beijing (CN); Beijing Boe Optoelectronoic Technology Co., Ltd., Beijing (CN)

( * ) Notice: Subject to any disclaimer, the term of this patent is extended or adjusted under 35 U.S.C. 154(b) by 8 days.

(21) Appl. No.: 14/894,049

(22) PCT Filed: Apr. 14, 2015

(86) PCT No.: PCT/CN2015/076560
§ 371 (c)(1),
(2) Date: Nov. 25, 2015

(87) PCT Pub. No.: WO2016/115781
PCT Pub. Date: Jul. 28, 2016

(65) Prior Publication Data
US 2016/0357283 A1 Dec. 8, 2016

(30) Foreign Application Priority Data
Jan. 21, 2015 (CN) .......................... 2015 1 0031058

(51) Int. Cl.
*G01R 31/26* (2014.01)
*G06F 3/044* (2006.01)
(Continued)

(52) U.S. Cl.
CPC ............ *G06F 3/044* (2013.01); *G02F 1/1309* (2013.01); *G02F 1/13338* (2013.01);
(Continued)

(58) Field of Classification Search
CPC .............. G01R 31/2608; G01R 31/261; G01R 31/2612; G01R 31/2614; G01R 31/2616;
(Continued)

(56) References Cited

U.S. PATENT DOCUMENTS

| 8,791,887 B2 * | 7/2014 | Smith ................. G09G 3/3283 345/78 |
| 2005/0057182 A1 * | 3/2005 | Shibusawa ........... G09G 3/3233 315/209 R |

(Continued)

FOREIGN PATENT DOCUMENTS

| CN | 101728397 | 6/2010 |
| CN | 103293737 | 9/2013 |

(Continued)

OTHER PUBLICATIONS

International Search Report and Written Opinion from PCT/CN2015/076560 dated Oct. 14, 2015.
(Continued)

*Primary Examiner* — Tung X Nguyen
(74) *Attorney, Agent, or Firm* — Calfee, Halter & Griswold LLP

(57) ABSTRACT

The present invention discloses a touch display panel, a detecting method thereof, and a display device. The common electrode layer is divided into a plurality of indepen-
(Continued)

dent self capacitance electrodes, and the common electrode is multiplexed as self capacitance electrodes. There is no need to provide an additional film, and it is only required to modify the pattern of the common electrode layer in the current LCD panel. Thus, the production cost is reduced, and the production efficiency is improved. Since the self capacitance electrodes are formed by dividing the common electrode layer in the above-mentioned touch display panel, a compensating electrode is further provided which is arranged in a layer different from that of the self capacitance electrodes, is insulated from the self capacitance electrodes, and at least covers a portion of a partition gap between neighboring self capacitance electrodes. A common electrode signal is applied to the compensating electrode during a display period. In this way, the common electrode signal which is applied to the compensating electrode during display can compensate the common electrode signal at partition gaps of the self capacitance, thus ensuring that liquid crystal molecules at partition gaps normally invert and that the overall display panel displays normally.

20 Claims, 8 Drawing Sheets

(51) Int. Cl.
G02F 1/13 (2006.01)
G02F 1/1333 (2006.01)
G02F 1/1335 (2006.01)
G02F 1/1343 (2006.01)
G06F 3/041 (2006.01)
G02F 1/1362 (2006.01)

(52) U.S. Cl.
CPC .... *G02F 1/13439* (2013.01); *G02F 1/133308* (2013.01); *G02F 1/133512* (2013.01); *G02F 1/134336* (2013.01); *G06F 3/0412* (2013.01); *G06F 3/0416* (2013.01); *G02F 1/136213* (2013.01); *G02F 1/136286* (2013.01); *G02F 2201/121* (2013.01); *G02F 2201/123* (2013.01); *G06F 2203/04103* (2013.01); *G06F 2203/04111* (2013.01)

(58) Field of Classification Search
CPC  G01R 31/2617; G01R 31/2619; G01R 31/26; G01R 31/2642; G01R 31/2648; G01R 31/2831; G01R 31/31702
See application file for complete search history.

(56) References Cited

U.S. PATENT DOCUMENTS

2012/0044198 A1 2/2012 Chai et al.
2014/0062943 A1 3/2014 Choi et al.

FOREIGN PATENT DOCUMENTS

| CN | 104020891 | 9/2014 |
| CN | 104022128 | 9/2014 |
| CN | 104035615 | 9/2014 |
| CN | 104035639 | 9/2014 |
| CN | 104267862 | 1/2015 |
| JP | 2012208749 | 10/2012 |
| KR | 20130020485 | 2/2013 |
| WO | 2013/176518 | 11/2013 |

OTHER PUBLICATIONS

Office Action from China Application No. 201510031058.7 dated Jan. 19, 2017.

* cited by examiner

TOUCH DISPLAY PANEL, DETECTING METHOD THEREOF, AND DISPLAY DEVICE

The present application is the U.S. national stage entry of PCT/CN2015/076560, filed Apr. 14, 2015, which claims the benefit of Chinese Patent Application No. 201510031058.7 filed Jan. 21, 2015, the entire disclosures of which are incorporated herein by reference.

FIELD OF THE INVENTION

The present invention relates to the field of touch technology, and particularly to a touch display panel, a detecting method thereof, and a display device.

BACKGROUND OF THE INVENTION

With the fast development of display technology, a touch screen panel has been gradually become popular in people's lives. Currently the touch screen panel can be divided, on basis of its construction, into an Add On Mode touch screen panel, an On Cell touch screen panel, and an In Cell touch screen panel. In the Add On Mode touch screen panel, a touch screen panel and a liquid crystal display (LCD) panel are fabricated separately and then glued together to form a LCD panel with the touch function. The Add On Mode touch screen panel has the drawbacks of high fabrication cost, low light transmittance, and a large module thickness. Since touch electrodes of the In Cell touch screen panel are embedded inside the LCD panel, the overall module thickness can be reduced and the fabricating cost can be greatly decreased, making it the favorite choice of the panel manufacturers.

Currently, in the existing In Cell touch screen panels, a finger touch position is detected by virtue of the principle of mutual capacitance or self capacitance. In the case of detection by virtue of self capacitance, a plurality of self capacitance electrodes which are arranged in the same layer and insulated from each other can be arranged in the touch screen panel. In case a human body does not touch the panel, each self capacitance electrode is subject to a capacitance of a constant value. In case the human body touches the panel, the corresponding self capacitance electrode is subject to a capacitance which is the sum of the constant value and the human body capacitance. A touch detecting chip can determine the touch position by detecting variation in capacitance value of each self capacitance electrode during a touch period. In the case of detection by virtue of self capacitance, the human body capacitance can act on all self capacitance, while the human body capacitance can only act on a projection capacitance in the case of mutual capacitance. Therefore, the touch variation amount which results from the human body's touching the panel is larger in the case of the touch screen panel in which the detection is based on mutual capacitance. Therefore, as compared with the touch screen panel based on mutual capacitance, the touch screen panel based on self capacitance can effectively improve the signal-to-noise ratio of touching detection, thus improving the accuracy in touch sensing.

SUMMARY OF THE INVENTION

In view of this, embodiments of the present invention provide a touch display panel, a detecting method thereof, and a display device, which avoid or at least alleviate one or more problems in the prior art. According to technical solutions of the present invention, it is possible to avoid the problem of abnormal display due to a gap between self capacitance electrodes, and thus improve display effect of the touch display panel.

Therefore, in an embodiment of the present invention, it is provided a touch display panel, comprising: an upper substrate and a lower substrate which are arranged oppositely, a liquid crystal layer between the upper substrate and the lower substrate, a pixel electrode and a common electrode layer which are insulated from each other, and a plurality of wires, wherein the common electrode layer is divided into a plurality of independent self capacitance electrodes, and each self capacitance electrode is connected with a corresponding wire. The touch display panel further comprises:

a compensating electrode which is arranged in a layer different from that of the self capacitance electrodes, is insulated from the self capacitance electrodes, and at least covers a portion of a partition gap between neighboring self capacitance electrodes, wherein a common electrode signal is applied to the compensating electrode during a display period;

wherein the self capacitance electrodes, the wires, and the compensating electrode are arranged on a surface of the upper substrate facing the lower substrate or a surface of the lower substrate facing the upper substrate.

Preferably, in an embodiment of the above touch display panel, the compensating electrode completely covers the partition gap between neighboring self capacitance electrodes.

Preferably, in an embodiment of the above touch display panel, an orthographic projection of the compensating electrode onto the lower substrate is a grid structure which at least covers all of the partition gaps.

Preferably, in an embodiment of the above touch display panel, the compensating electrode is made from transparent electrically conductive material.

Preferably, in an embodiment of the above touch display panel, the touch display panel further comprises: a black matrix layer which is arranged on a surface of the upper substrate facing the lower substrate or a surface of the lower substrate facing the upper substrate;

an orthographic projection of the partition gap between two neighboring self capacitance electrodes onto the lower substrate falls within a region where a pattern of the black matrix layer is located.

Preferably, in an embodiment of the above touch display panel, the self capacitance electrodes are arranged on a surface of the lower substrate facing the upper substrate, the pixel electrode is arranged above the common electrode layer, and the compensating electrode and the pixel electrode are arranged in the same layer.

Preferably, in an embodiment of the above touch display panel, the self capacitance electrodes are arranged on a surface of the lower substrate facing the upper substrate, the common electrode is arranged above the pixel electrode, and the compensating electrode is arranged above the common electrode.

Preferably, in an embodiment of the above touch display panel, each wire is arranged in a layer different from that of the self capacitance electrodes, and each wire is connected with a corresponding self capacitance electrode through a via hole.

Preferably, in an embodiment of the above touch display panel, an orthographic projection of each wire onto the lower substrate falls within a region where a pattern of the black matrix layer is located.

Preferably, in an embodiment of the above touch display panel, the touch display panel further comprises a touch detecting chip which is electrically connected with each wire, wherein the touch detecting chip is configured to apply a common electrode signal to each self capacitance electrode and the compensating electrode during a display period, and to determine a touch position by detecting variation in the capacitance value of each self capacitance electrode during a touch period.

Preferably, in an embodiment of the above touch display panel, the compensating electrode is an integral piece, and there is an overlapping region of a predefined size between the integral piece and each self capacitance electrode.

Accordingly, in case the compensating electrode is an integral piece, and there is an overlapping region of a predefined size between the integral piece and each self capacitance electrode, embodiments of the present invention further provide a method for detecting the above-mentioned touch display panel, comprising:

prior to bonding the touch display panel to a driving chip, connecting the compensating electrode in each overlapping region between the compensating electrode and each self capacitance electrode with the self capacitance electrodes;

applying a common electrode signal to the compensating electrode, applying a test signal to the pixel electrode, and judging whether all pixels in the touch display panel display normally;

in case all pixels in the touch display panel display normally, cutting off the connection position between the compensating electrode and the self capacitance electrode in each overlapping region, so that the compensating electrode is insulated from each self capacitance electrode, and bonding the touch display panel to the driving chip;

otherwise, determining that one or more self capacitance electrodes in the touch display panel are abnormal.

Preferably, connecting the compensating electrode in each overlapping region between the compensating electrode and each self capacitance electrode with the self capacitance electrodes is performed by laser welding.

Preferably, cutting off the connection position between the compensating electrode and the self capacitance electrode in each overlapping region is performed by laser cutting.

Accordingly, embodiments of the present invention further provide a display device, which comprises any one of the above mentioned touch display panels.

In the touch display panel, the detecting method thereof, and the display device of embodiments of the present invention, the common electrode layer is divided into a plurality of independent self capacitance electrodes, and the common electrode is multiplexed as self capacitance electrodes. There is no need to provide an additional film, and it is only required to modify the pattern of the common electrode layer in the current LCD panel. Thus, the production cost is reduced, and the production efficiency is improved. Since the self capacitance electrodes are formed by dividing the common electrode layer in the above-mentioned touch display panel, a compensating electrode is further provided which is arranged in a layer different from that of the self capacitance electrodes, is insulated from the self capacitance electrodes, and at least covers a portion of a partition gap between neighboring self capacitance electrodes. A common electrode signal is applied to the compensating electrode during a display period. In this way, the common electrode signal which is applied to the compensating electrode during display can compensate the common electrode signal at partition gaps of the self capacitance, thus ensuring that liquid crystal molecules at partition gaps normally invert and that the overall display panel displays normally. In addition, the common electrode signal which is applied to the compensating electrode can further guarantee that capacitance of signal lines at corresponding regions of the compensating electrode equals to capacitance of signal lines of the same type below the self capacitance electrode, thus ensuring signals in signal lines of the same type in the touch display panel have the same delay.

DETAILED DESCRIPTION OF THE INVENTION

The touch display panel, the detecting method thereof, and the display device of the present invention will be described in details hereinafter in embodiments by referring to the accompanying drawings.

In the accompanying drawings, the thickness and shape of each film does not represent real scale, and only intends to illustrate contents of the present invention.

Figure 1:
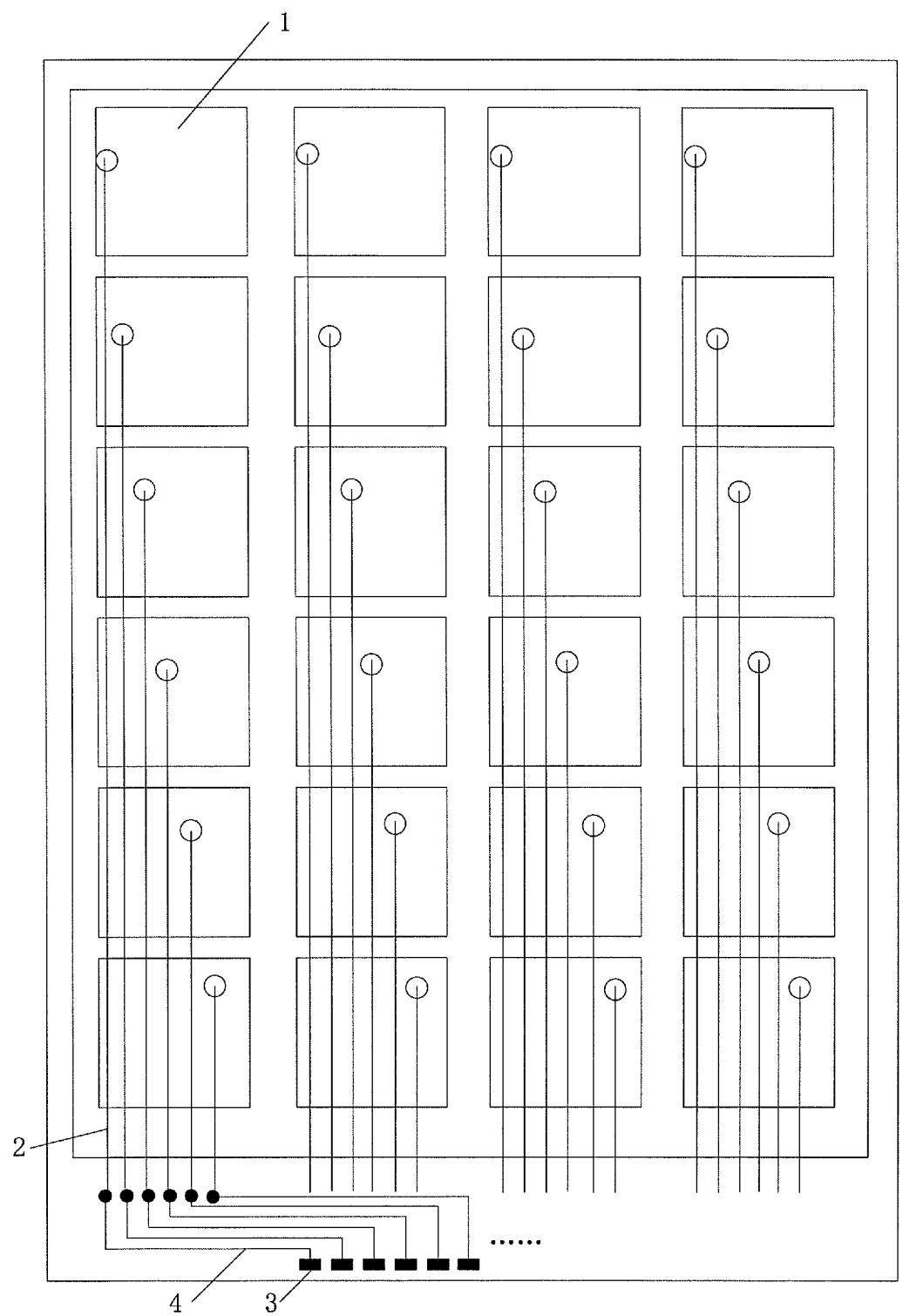
FIG. 1 is a structural view for illustrating an exiting In Cell touch screen panel.

In case an In Cell touch screen panel is applied to a LCD panel, a common electrode is generally multiplexed as self capacitance electrodes. Namely, the common electrode which is arranged in a layer is divided into several independent self capacitance electrodes. The specific structure of self capacitance electrodes is shown in FIG. 1. The common electrode is divided into several independent self capacitance electrodes 1. Neighboring self capacitance electrodes 1 are insulated from each other by a gap. Each self capacitance electrodes 1 is connected with a touch detecting chip via an individual lead. In particular, each lead comprises: wires 2 which connect the self capacitance electrodes 1 to a frame of the touch screen panel, and peripheral wiring 4 which are arranged at the frame and connect the self capacitance electrodes 1 to terminals 3 of the touch detecting chip.

In the LCD panel, a display is realized by inversion of liquid crystal molecules under control of the electric filed between the common electrode and the pixel electrode. The inventor found that in the above-mentioned In Cell touch screen panel, since the common electrode is divided into several independent self capacitance electrodes, and the gap between neighboring self capacitance electrodes contains no common electrode, inversion of liquid crystal molecules at the gap would be abnormal during display, which impairs display effect of the whole display screen.

Figure 2A:
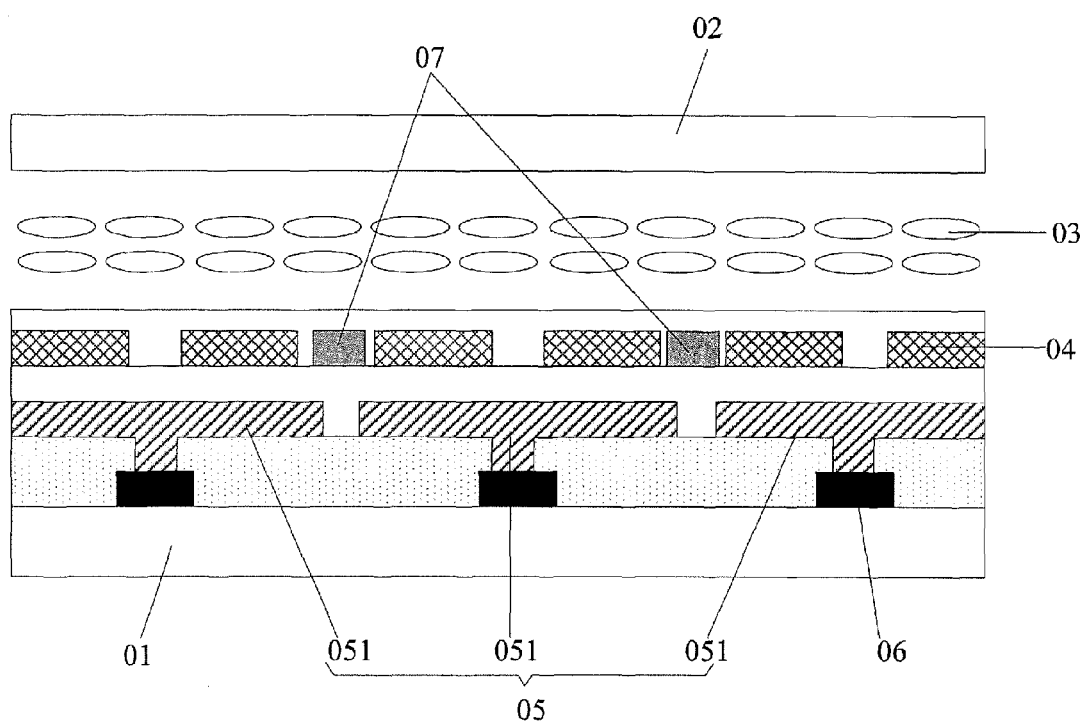
FIG. 2a is a structural view for illustrating a touch display panel according to an embodiment of the present invention.
Figure 2B:
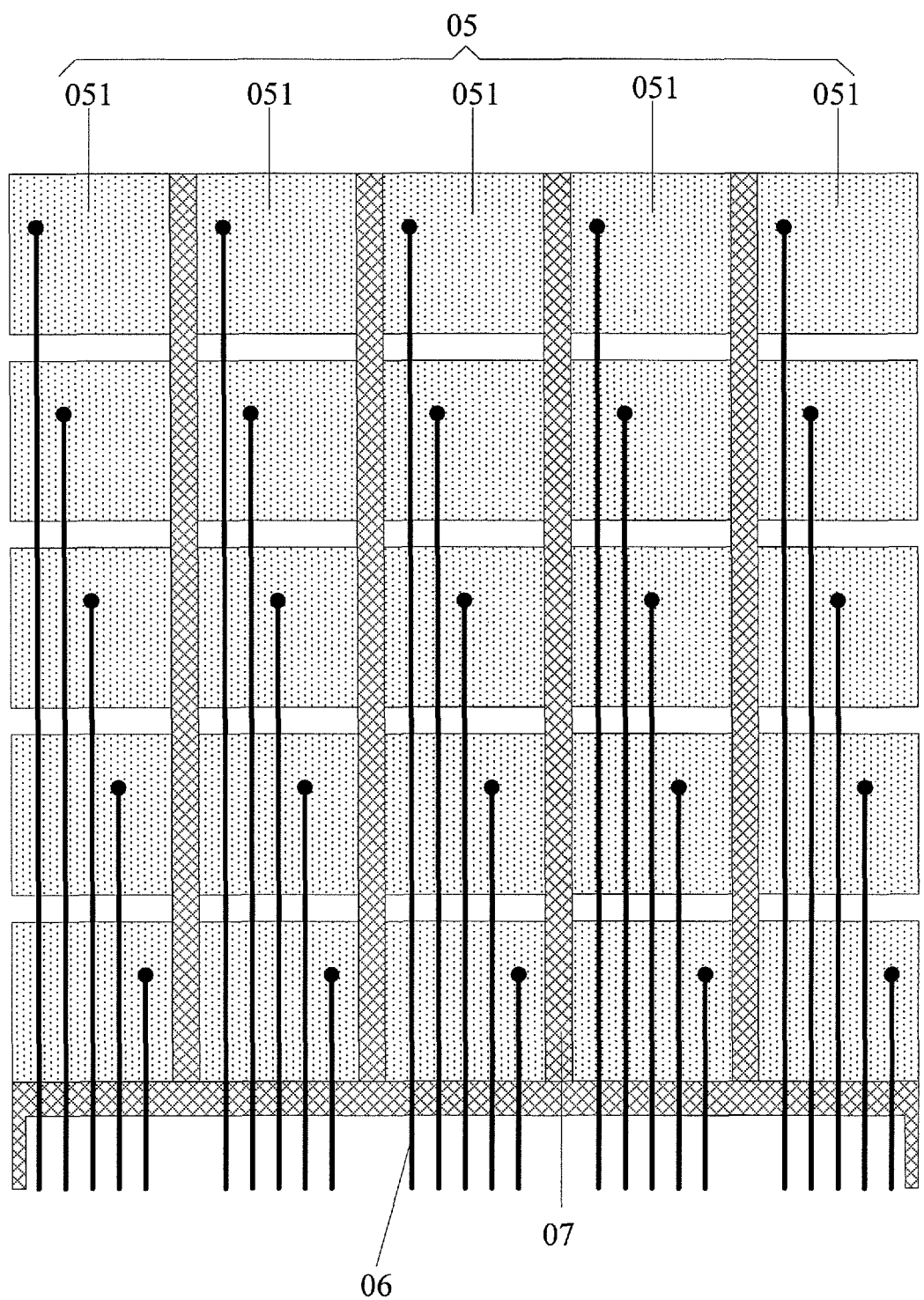
FIG. 2b is a top view for illustrating a compensating electrode in a touch display panel according to an embodiment of the present invention.

A touch display panel is provided in an embodiment of the present invention. As shown in FIG. 2a and FIG. 2b, the touch display panel comprises: a lower substrate 01 and an upper substrate 02 which are arranged oppositely, a liquid crystal layer 03 between the upper substrate 02 and the lower substrate 01, a pixel electrode 04 and a common electrode layer 05 which are insulated from each other, and a plurality of wires 06. The common electrode layer is divided into a plurality of independent self capacitance electrodes 051, and the self capacitance electrodes 051 are connected with corresponding wires 06. The touch display panel further comprises: a compensating electrode 07 which is arranged in a layer different from that of the self capacitance electrodes 051, is insulated from the self capacitance electrodes 051, and at least covers a portion of a partition gap between neighboring self capacitance electrodes 051, wherein a common electrode signal is applied to the compensating electrode 07 during a display period; wherein the self capacitance electrodes 051, the wires 06, and the compensating electrode 07 are arranged on a surface of the upper substrate 02 facing the lower substrate 01 or a surface of the lower substrate 01 facing the upper substrate 02. FIG. 2a is a schematic view in which the self capacitance electrode, the wires, and the compensating electrode are arranged on a surface of the lower substrate facing the upper substrate, and FIG. 2b is a top view for the self capacitance electrode, the wires, and the compensating electrode.

In the above touch display panel provided in embodiments of the present invention, the common electrode layer is divided into a plurality of independent self capacitance electrodes, and the common electrode is multiplexed as self capacitance electrodes. There is no need to provide an additional film, and it is only required to modify the pattern of the common electrode layer in the current LCD panel. Thus, the production cost is reduced, and the production efficiency is improved. Since the self capacitance electrodes are formed by dividing the common electrode layer in the above-mentioned touch display panel, a compensating electrode is further provided which is arranged in a layer different from that of the self capacitance electrodes, is insulated from the self capacitance electrodes, and at least covers a portion of a partition gap between neighboring self capacitance electrodes. A common electrode signal is applied to the compensating electrode during a display period. In this way, the common electrode signal which is applied to the compensating electrode during display can compensate the common electrode signal at partition gaps of the self capacitance, thus ensuring that liquid crystal molecules at partition gaps normally invert and that the overall display panel displays normally. In addition, the common electrode signal which is applied to the compensating electrode can further guarantee that capacitance of signal lines at corresponding regions of the compensating electrode equals to capacitance of signal lines of the same type below the self capacitance electrode, thus ensuring signals in signal lines of the same type in the touch display panel have the same delay.

The above-mentioned touch display panel is not only applicable to a Twisted Nematic (TN) LCD panel, but also to an Advanced Dimension Switch (ADS) LCD panel, a High-Advanced Dimension Switch (HADS) LCD panel, and an In-Plane Switch (IPS) LCD panel.

Figure 3:
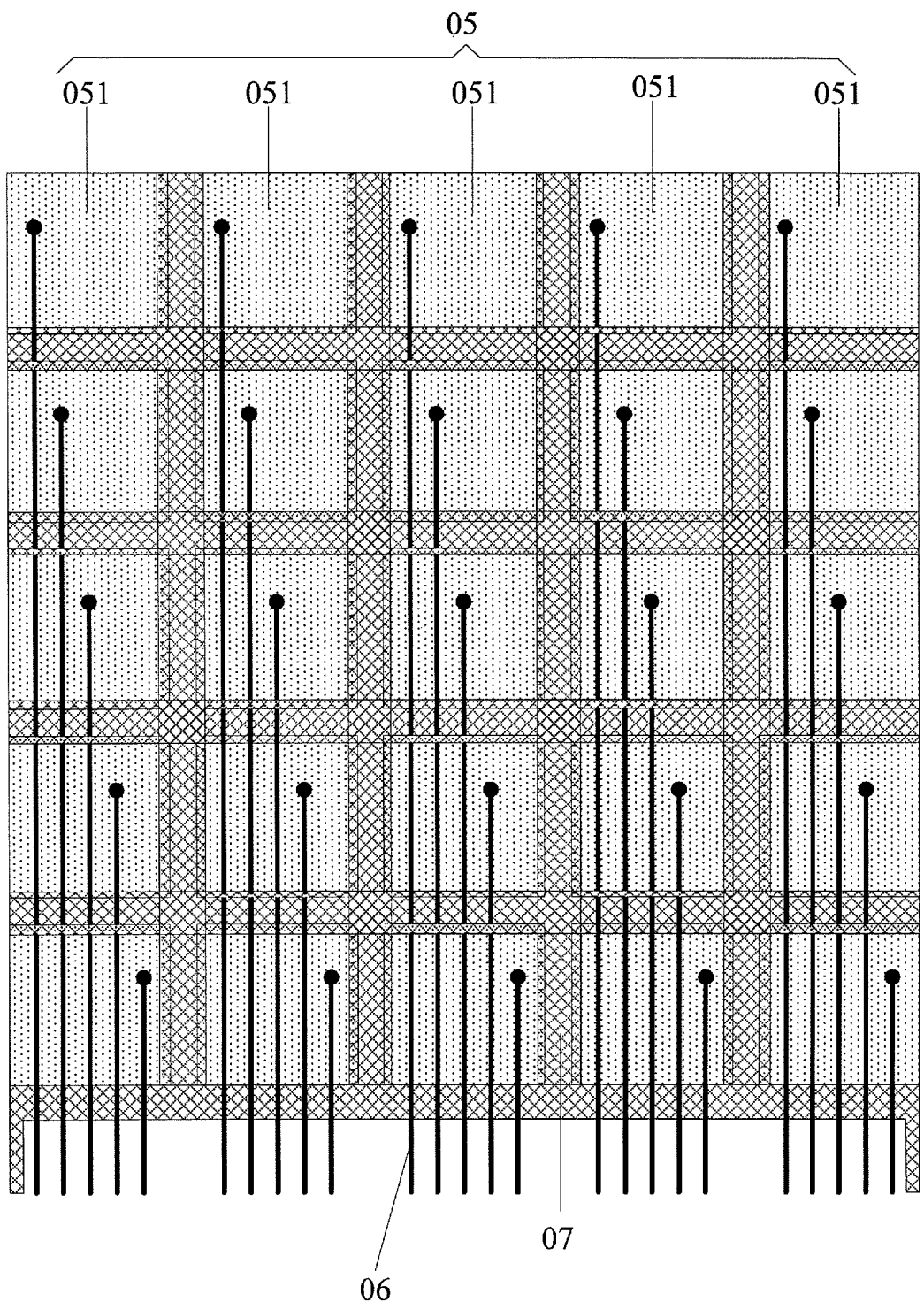
FIG. 3 is another top view for illustrating a compensating electrode in a touch display panel according to an embodiment of the present invention.

Preferably, in the touch display panel as shown in FIG. 3, the compensating electrode 07 completely covers the partition gap between neighboring self capacitance electrodes 051.

Preferably, in the touch display panel as shown in FIG. 3, in view of the dimensional deviation and registration accuracy during fabrication, an orthographic projection of the compensating electrode 07 onto the lower substrate is a grid structure which at least covers all of the partition gaps. Namely, the compensating electrode 07 has a width which is slightly larger than the width of the partition gap at the corresponding position.

Further, in an embodiment of the above touch display panel, the compensating electrode is made from a transparent electrically conductive material, in order to avoid affecting the aperture ratio of the compensating electrode.

Generally, the touch screen panel has a density in the order of millimeters. Therefore, in practical implementations, the density and footprint of each self capacitance electrode can be set according to the required touch density, so as to provide the required touch density. Generally, each self capacitance electrode is designed as a square electrode of the size of about 5 mm*5 mm. The display screen generally has a density in the order micrometers. Therefore, one self capacitance electrode generally corresponds to a plurality of pixels in the display screen.

In the above-mentioned touch display panel, the existing common electrode layer which is arranged in a layer is divided into a plurality of self capacitance electrodes. a dividing line for dividing the common electrode layer generally does not pass the aperture region for display and is arranged in a pattern region of the black matrix layer, so as not to affect the normal display function.

In particular, in an embodiment, the touch display panel further comprises: a black matrix layer which is arranged on a surface of the upper substrate facing the lower substrate or a surface of the lower substrate facing the upper substrate;

an orthographic projection of the partition gap between two neighboring self capacitance electrodes onto the lower substrate falls within a region where a pattern of the black matrix layer is located Preferably, in order to avoid a touch dead region between self capacitance electrodes, in an embodiment of the touch display panel as shown in FIG. 3, each wire 06 is arranged in a layer different from that of the self capacitance electrodes 051, and each wire 06 is connected to a corresponding self capacitance electrode 051 through a via hole.

In particular, since wires are generally made from metallic materials, in an embodiment of the touch display panel, an orthographic projection of each wire onto the lower substrate falls within a region where a pattern of the black matrix layer is located, so that the wires of metallic materials do not affect the aperture ratio of the display panel.

Further, in case the above-mentioned In Cell touch screen panel is applied to an ADS LCD panel, the planar common electrode layer lies below the slit-shaped pixel electrode. Namely, the common electrode layer lies between the lower substrate and the pixel electrode, and an insulating layer is further arranged between the common electrode layer and the pixel electrode. However, in case the above-mentioned In Cell touch screen panel is applied to a HADS LCD panel, the slit-shaped common electrode lies above the planar pixel electrode. Namely, the pixel electrode lies between the lower substrate and the common electrode, and an insulating layer is further arranged between the pixel electrode and the common electrode.

Therefore, in case the above-mentioned touch display panel is applied to the HADS LCD panel, the self capacitance electrodes are arranged on a surface of the lower substrate facing the upper substrate, the pixel electrode is arranged above the common electrode layer, and the compensating electrode and the pixel electrode are arranged in the same layer. The pixel electrode is only arranged at a position corresponding to each pixel, and the compensating electrode just lies between neighboring pixels. Thus, the pattern of the pixel electrode layer in the existing LCD panel can be modified, a pattern for the pixel electrode and the compensating electrode can be formed by performing the patterning process once. In this way, it is not necessary to provide an additional film, thus reducing the production cost and improving the production efficiency.

Therefore, in case the touch display panel is applied to the ADS LCD panel, the self capacitance electrodes are arranged on a surface of the lower substrate facing the upper substrate, the common electrode is arranged above the pixel electrode, and the compensating electrode is arranged above the common electrode. After the common electrode is formed during fabrication, an insulating layer and an electrically conductive layer are successively formed on the common electrode, and a pattern of the compensating electrode is formed in the electrically conductive layer by performing the patterning process once. Therefore, as compared with the case the touch display panel is applied to the HADS LCD panel, in case the touch display panel is applied to the ADS LCD panel, two films and one patterning process are additionally involved.

In particular, since the common electrode layer is multiplexed as self capacitance electrodes in the above-mentioned touch display panel, it is required to adopt time-division driving for the touch period and the display period, in order to reduce interference between the display signal and the touch signal. Besides, the display driving chip and the touch detecting chip can be integrated in a single chip, which further reduces production cost.

Therefore, in practical implementations, the above-mentioned touch display panel can further comprise: a touch detecting chip which is electrically connected with each wire. The touch detecting chip is configured to apply a common electrode signal to each self capacitance electrode and the compensating electrode during a display period, and to determine a touch position by detecting variation in the capacitance value of each self capacitance electrode during a touch period.

Further, in practical implementations, the touch detecting chip applies the common electrode signal to the compensating electrode during the display period, so that liquid crystal molecules at the partition gaps between self capacitance electrodes can rotate normally. The touch detecting chip does not applies the signal to the compensating electrode during the touch period, so that the compensating electrode does not bring about noise to the self capacitance electrodes. Of course, the touch detecting chip can also apply the common electrode signal to the compensating electrode during the touch period, and the present invention does not intend to be restricted in this regard.

Figure 4A:
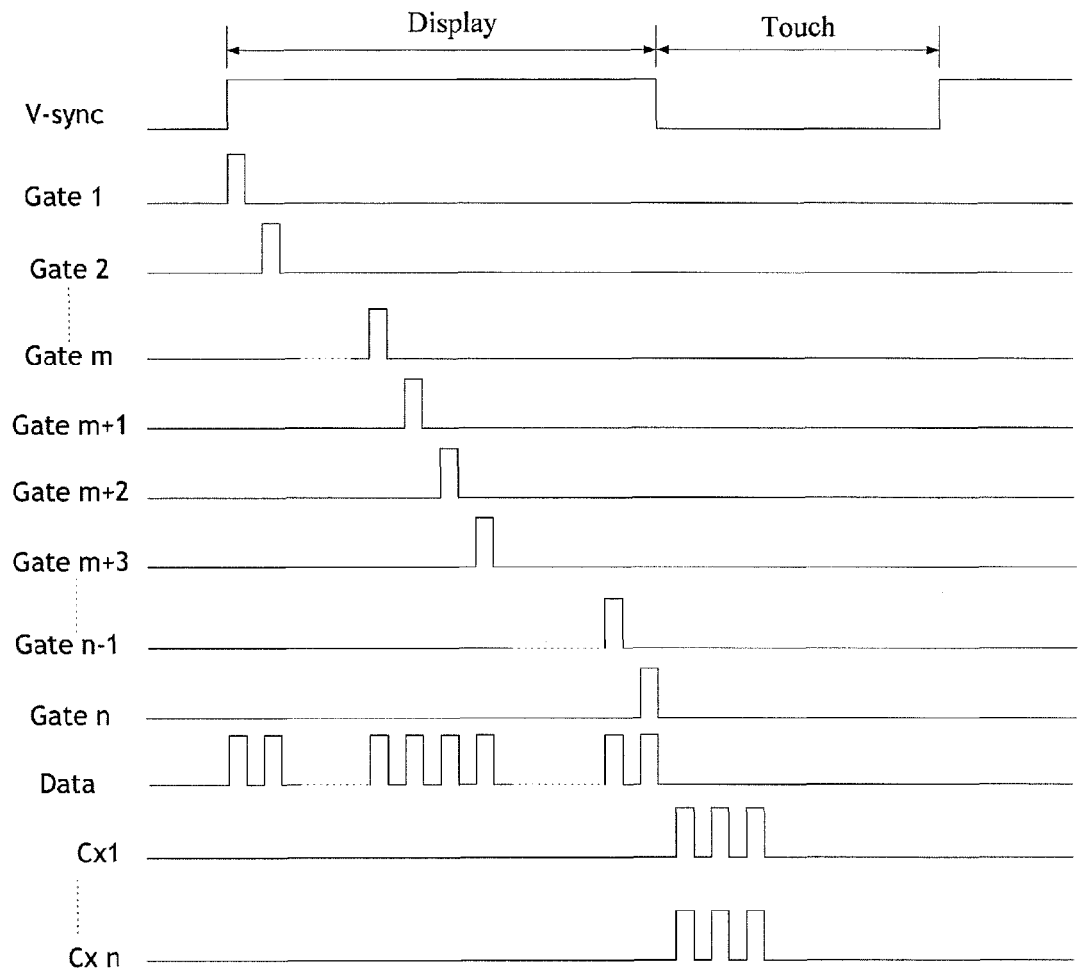
FIG. 4a is a driving timing diagram for illustrating a touch display panel according to an embodiment of the present invention.
Figure 4B:
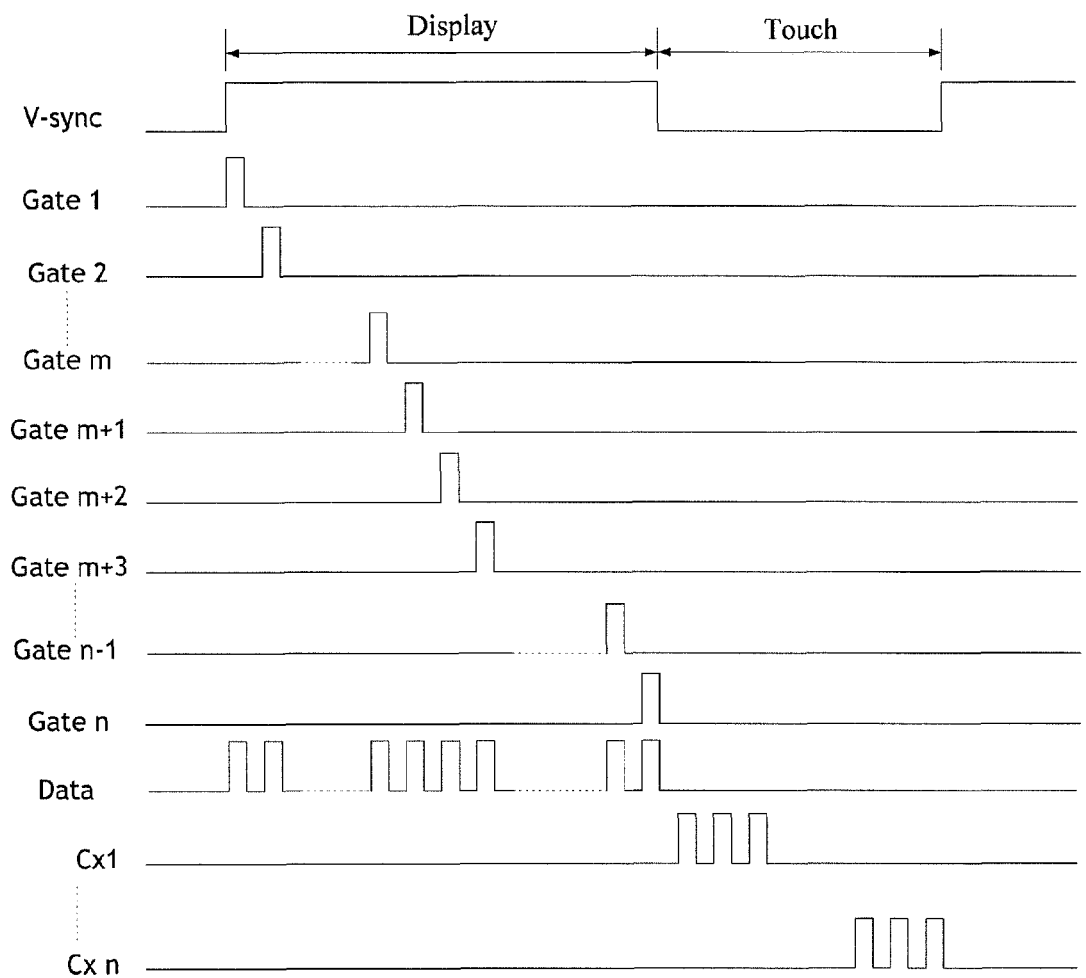
FIG. 4b is another driving timing diagram for illustrating a touch display panel according to an embodiment of the present invention.

For example, in the driving timings shown in FIG. 4a and FIG. 4b, each display frame (V-sync) of the touch display panel is divided into a display period (Display) and a touch period (Touch) in time. As shown in the driving timings of FIG. 4a and FIG. 4b, a display frame of the touch display panel is 16.7 ms, 5 ms of which is the touch period and the remaining 11.7 ms of which is the display period. Of course, according to the processing capacity of the IC chip, the touch period and the display period can have durations different from those set forth above. During the display period (Display), a gate scan signal is successively applied to each gate signal line Gate 1, Gate 2 . . . Gate n in the touch display panel, a gray level signal is applied to the data signal line Data, and the touch detecting chip which is connected with each self capacitance electrode Cx 1 . . . Cx n applies the common electrode signal to each self capacitance electrode Cx 1 . . . Cx n respectively, so as to realize the display function of the liquid crystal molecules. During the touch period (Touch), as shown in FIG. 4a, the touch detecting chip which is connected with each self capacitance electrode Cx 1 . . . Cx n applies a driving signal to each self capacitance electrode Cx 1 . . . Cx n simultaneously, and at the same time receives a feedback signal from each self capacitance electrode Cx 1 . . . Cx n. Optionally, as shown in FIG. 4b, the touch detecting chip which is connected with each self capacitance electrode Cx 1 . . . Cx n applies the driving signal to each self capacitance electrode Cx . . . Cx n successively, and receives the feedback signal from each self capacitance electrode Cx 1 . . . Cx n. The feedback signal is analyzed to determine whether a touch occurs, so that the touch function is realized.

Further, in an embodiment of the touch display panel, the compensating electrode is an integral piece, and there is an overlapping region of a predefined size between the integral piece and each self capacitance electrode. By forming the compensating electrode as an integral piece, the signal can be received through one signal port. By arranging the compensating electrode in such a manner that there is an overlapping region of a predefined size between the integral piece and each self capacitance electrode, the detection of self capacitance electrodes is facilitated.

It is well known that a complete touch display screen generally comprises a touch display panel, a driving chip, and a printed circuit board. During fabrication, the touch display panel, the driving chip (comprise the above-mentioned touch detecting chip in embodiments of the present invention), and the printed circuit board are fabricated separately and then bonded together. However, in order to save cost, it is generally required to check whether the touch display panel qualified prior to bonding. Therefore, prior to bonding the touch display panel and the driving chip, it is necessary to detect performances of the touch display panel. During detecting whether each self capacitance electrode is qualified, since the self capacitance electrodes are independent from each other, it is necessary to provide a Thin Film Transistor (TFT) for each self capacitance electrode in the prior art. The gate of each TFT is connected with the same switch control line, the source of each TFT is connected with the same signal line for receiving the common electrode signal, and the drain of each TFT is connected with a corresponding self capacitance electrode. In this way, the common electrode signal is input to signal lines and the test signal is input to each pixel electrode during test. When the control signal is input to the switch control line, the TFT is turned on. At this time, the whole touch display panel displays normally if all self capacitance electrodes operate normally. If some pixels can not display normally, this indicates that self capacitance electrodes at positions corresponding to these pixels are abnormal, and the touch display panel is not qualified.

Thus, in the prior art, for the purpose of testing whether all self capacitance electrodes are normal, it is not only required to individually provide a TFT for each self capacitance electrode, but also to provide many lines which are connected with each TFT. This not only increases the cost, but also occupies a lot of space in the touch display panel and reduces the aperture ratio of the touch display panel.

Figure 5:
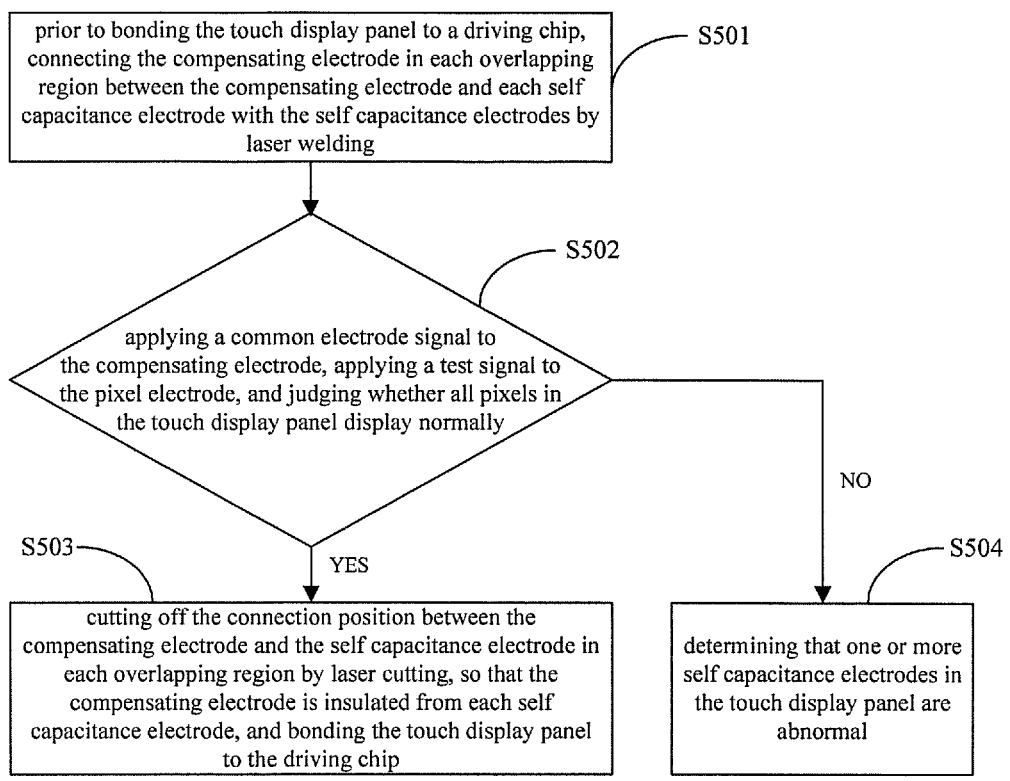
FIG. 5 is a flow chart for illustrating a detecting method for a touch display panel according to an embodiment of the present invention.
Figure 6:
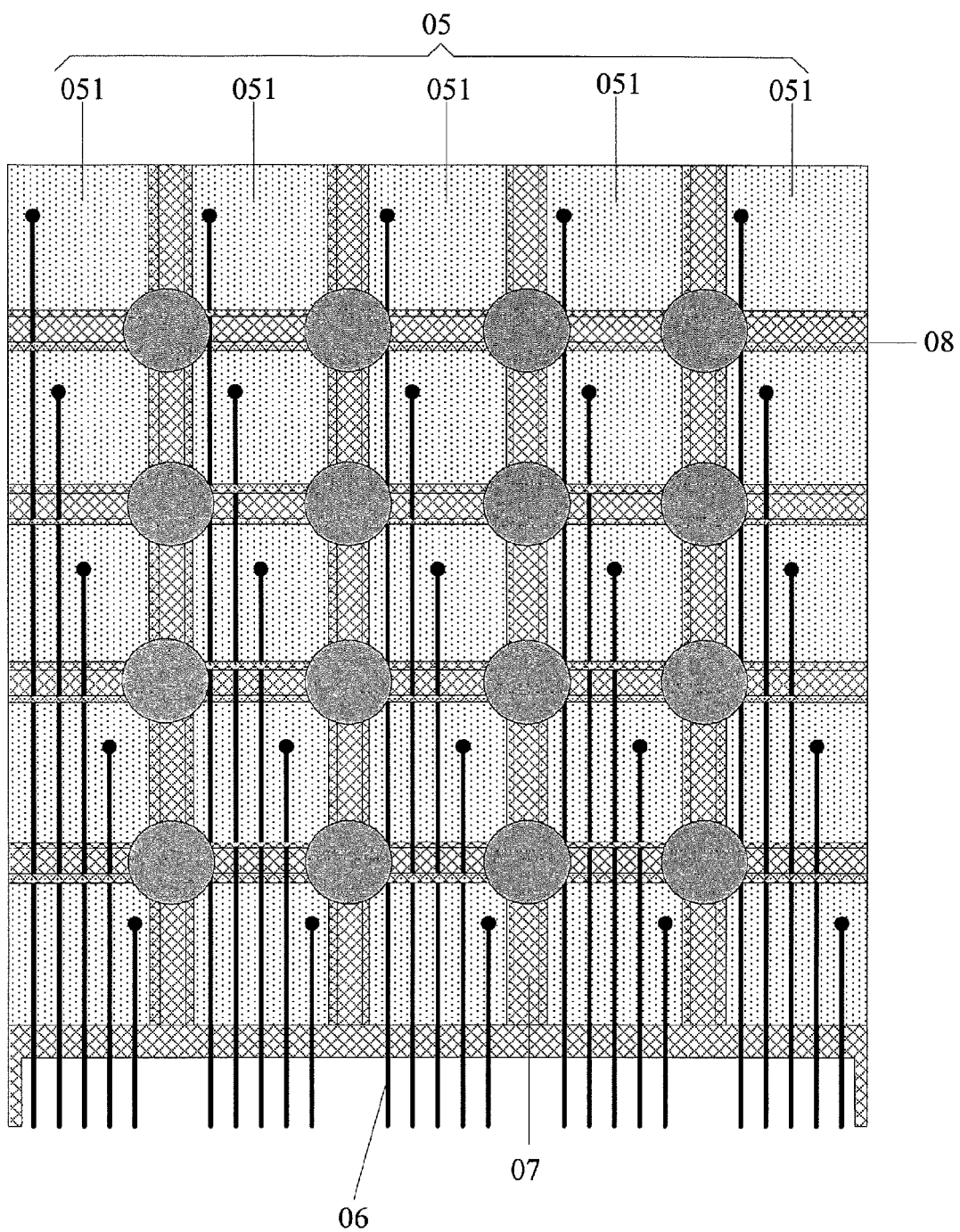
FIG. 6 is a structural view for illustrating a touch display panel according to an embodiment of the present invention, in which a compensating electrode and a self capacitance electrode have been connected by laser welding.

Therefore, based on the same inventive concept, in case the compensating electrode in the above-mentioned touch display panel is an integral piece, and there is an overlapping region of a predefined size between the integral piece and each self capacitance electrode, an embodiment of the present invention further provides a method for detecting the touch display panel. As shown in FIG. 5, the method can comprise the following steps:

S501, prior to bonding the touch display panel to the driving chip, as shown in FIG. 6, connecting the compensating electrode 07 in each overlapping region between the compensating electrode 07 and each self capacitance electrode 051 with the self capacitance electrodes 051 by laser welding; wherein a connection point 08 between the compensating electrode 07 and the self capacitance electrodes 051 is shown in FIG. 6;

S502, applying a common electrode signal to the compensating electrode, applying a test signal to the pixel electrode, and judging whether all pixels in the touch display panel display normally; in case all pixels in the touch display panel display normally, turning to step S503, and otherwise, turning to step S504, S503, cutting off the connection position between the compensating electrode and the self capacitance electrode in each overlapping region by laser cutting, so that the compensating electrode is insulated from each self capacitance electrode, and bonding the touch display panel to the driving chip;

S504, determining that one or more self capacitance electrodes in the touch display panel are abnormal.

In the above description, the compensating electrode is connected with and disconnected from the self capacitance electrodes by laser welding and laser cutting respectively. It will be appreciated by a skilled in the art that laser welding and laser cutting are preferred methods for connecting and disconnecting the compensating electrode and the self capacitance electrodes. The compensating electrode can be connected with and disconnected from the self capacitance electrodes by other methods as required.

In the above-mentioned detecting method, the compensating electrode is an integral piece and there is an overlapping region of a predefined size between the integral piece and each self capacitance electrode. Thus, prior to bonding the touch display panel to the driving chip, the compensating electrode in each overlapping region between the compensating electrode and each self capacitance electrode can be connected with the self capacitance electrodes by laser welding, so that all self capacitance electrodes are conducted as a whole. In case the common electrode signal is applied to the compensating electrode, the common electrode signal can be transferred to all self capacitance electrodes. When the test signal is applied to the pixel electrode, it is possible to determine whether all pixels in the touch display panel display normally. In case the common electrode signal is applied to all self capacitance electrodes, all pixels in the touch display panel can normally display. In case the common electrode signal is not applied to one or more self capacitance electrodes, liquid crystal molecules corresponding to such self capacitance electrode(s) can not normally invert, and the pixel at such a position visually exhibits abnormal display. Therefore, it is possible to determine whether the touch display panel is qualified by judging the display status of all pixels in the touch display panel. In case the touch display panel is qualified, the connection position between the compensating electrode and the self capacitance electrode in each overlapping region is cut off by laser cutting, so that the compensating electrode is insulated from each self capacitance electrode, and then the touch display panel is bonded to the driving chip. In this way, it is possible to avoid unnecessary waste due to the fact that a disqualified touch display panel is bonded to the driving chip.

In the above-mentioned detecting method, the common electrode signal can be applied to all self capacitance electrodes through the compensating electrode. As compared with the prior art, the TFTs for detection and the wiring connected with each TFT can be omitted, so that the cost can be reduced and the aperture ratio can be increased.

Based on the same inventive concept, an embodiment of the present invention further provides a display device, which comprises the above-mentioned In Cell touch screen panel. The display device can be any product or component with a display function, e.g., a mobile phone, a tablet computer, a TV set, a monitor, a notebook computer, a digital photo frame, and a navigator. For implementations of the display device, reference can be made to the above embodiments for the touch display panel, which are not repeated for simplicity.

In the touch display panel, the detecting method thereof, and the display device of embodiments of the present invention, the common electrode layer is divided into a plurality of independent self capacitance electrodes, and the common electrode is multiplexed as self capacitance electrodes. There is no need to provide an additional film, and it is only required to modify the pattern of the common electrode layer in the current LCD panel. Thus, the production cost is reduced, and the production efficiency is improved. Since the self capacitance electrodes are formed by dividing the common electrode layer in the above-mentioned touch display panel, a compensating electrode is further provided which is arranged in a layer different from that of the self capacitance electrodes, is insulated from the self capacitance electrodes, and at least covers a portion of a partition gap between neighboring self capacitance electrodes. A common electrode signal is applied to the compensating electrode during a display period. In this way, the common electrode signal which is applied to the compensating electrode during display can compensate the common electrode signal at partition gaps of the self capacitance, thus ensuring that liquid crystal molecules at partition gaps normally invert and that the overall display panel displays normally. In addition, the common electrode signal which is applied to the compensating electrode can further guarantee that capacitance of signal lines at corresponding regions of the compensating electrode equals to capacitance of signal lines of the same type below the self capacitance electrode, thus ensuring signals in signal lines of the same type in the touch display panel have the same delay.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:

1. A touch display panel, comprising:
   an upper substrate and a lower substrate which are arranged oppositely;

a liquid crystal layer between the upper substrate and the lower substrate;
a pixel electrode and a common electrode layer which are insulated from each other; and
a plurality of wires;
wherein the common electrode layer is divided into a plurality of self capacitance electrodes, and each self capacitance electrode is connected to one of the plurality of wires;
a compensating electrode arranged in a layer different from that of the self capacitance electrodes and insulated from the self capacitance electrodes;
wherein the compensating electrode at least covers a portion of a partition gap between neighboring self capacitance electrodes;
wherein a common electrode signal is applied to the compensating electrode during a display period; and
wherein the self capacitance electrodes, the wires, and the compensating electrode are arranged on a surface of one of the upper substrate and the lower substrate so that the self capacitance electrodes, the wires, and the compensating electrode face the other of the upper substrate and the lower substrate.

2. The touch display panel of claim 1, wherein the compensating electrode completely covers the partition gap between neighboring self capacitance electrodes.

3. The touch display panel of claim 2, wherein an orthographic projection of the compensating electrode onto the lower substrate forms a grid structure which at least covers all of the partition gaps between the self capacitance electrodes.

4. The touch display panel of claim 1, wherein the compensating electrode is made from a transparent electrically conductive material.

5. The touch display panel of claim 1, further comprising:
a black matrix layer arranged on a surface of one of the upper substrate and the lower substrate so that the black matrix layer faces the other of the upper substrate and the lower substrate; and
an orthographic projection of the partition gap between two neighboring self capacitance electrodes onto the lower substrate is within a region of the black matrix layer.

6. The touch display panel of claim 5, wherein:
the self capacitance electrodes are arranged on a surface of the lower substrate facing the upper substrate;
the pixel electrode is arranged above the common electrode layer; and
the compensating electrode and the pixel electrode are arranged in the same layer.

7. The touch display panel of claim 5, wherein:
the self capacitance electrodes are arranged on a surface of the lower substrate facing the upper substrate;
the common electrode is arranged above the pixel electrode; and
the compensating electrode is arranged above the common electrode.

8. The touch display panel of claim 5, wherein each wire is arranged in a layer different from that of the self capacitance electrodes, and each wire is connected to a corresponding self capacitance electrode through a via hole.

9. The touch display panel of claim 8, wherein an orthographic projection of each wire onto the lower substrate falls within a region of the black matrix layer.

10. The touch display panel of claim 1, further comprising:

a touch detecting chip which is electrically connected to each wire;
wherein the touch detecting chip is configured to apply a common electrode signal to each self capacitance electrode and the compensating electrode during a display period, and to determine a touch position by detecting a variation in the capacitance value of each self capacitance electrode during a touch period.

11. The touch display panel of claim 1, wherein the compensating electrode is an integral piece, and there is an overlapping region of a predefined size between the compensating electrode and each self capacitance electrode.

12. The touch display panel of claim 2, wherein the compensating electrode is an integral piece, and there is an overlapping region of a predefined size between the compensating electrode and each self capacitance electrode.

13. The touch display panel of claim 3, wherein the compensating electrode is an integral piece, and there is an overlapping region of a predefined size between the compensating electrode and each self capacitance electrode.

14. The touch display panel of claim 4, wherein the compensating electrode is an integral piece, and there is an overlapping region of a predefined size between the compensating electrode and each self capacitance electrode.

15. The touch display panel of claim 5, wherein the compensating electrode is an integral piece, and there is an overlapping region of a predefined size between the compensating electrode and each self capacitance electrode.

16. The touch display panel of claim 6, wherein the compensating electrode is an integral piece, and there is an overlapping region of a predefined size between the compensating electrode and each self capacitance electrode.

17. A method of inspecting a touch display panel, comprising:
providing a touch display panel comprising:
an upper substrate and a lower substrate which are arranged oppositely;
a liquid crystal layer between the upper substrate and the lower substrate;
a pixel electrode and a common electrode layer which are insulated from each other; and
a plurality of wires;
wherein the common electrode layer is divided into a plurality of self capacitance electrodes, and each self capacitance electrode is connected to one of the plurality of wires;
a compensating electrode arranged in a layer different from that of the self capacitance electrodes and insulated from the self capacitance electrodes;
wherein the compensating electrode at least covers a portion of a partition gap between neighboring self capacitance electrodes;
wherein a common electrode signal is applied to the compensating electrode during a display period;
wherein the self capacitance electrodes, the wires, and the compensating electrode are arranged on a surface of one of the upper substrate and the lower substrate so that the self capacitance electrodes, the wires, and the compensating electrode face the other of the upper substrate and the lower substrate; and
wherein the compensating electrode is an integral piece, and there is an overlapping region of a predefined size between the compensating electrode and each self capacitance electrode;
prior to bonding the touch display panel to a driving chip, connecting the compensating electrode in each overlapping region with the self capacitance electrodes;

applying a common electrode signal to the compensating electrode and a test signal to the pixel electrode;

judging whether all pixels in the touch display panel display normally;

cutting off the connection between the compensating electrode and the self capacitance electrode in each overlapping region so that the compensating electrode is insulated from each self capacitance electrode when all of the pixels display normally;

determining that one or more self capacitance electrodes in the touch display panel are abnormal when not all of the pixels display normally; and bonding the touch display panel to the driving chip only when all of the pixels display normally.

18. The method of inspecting a touch display panel of claim 17, wherein connecting the compensating electrode in each overlapping region between the compensating electrode and each self capacitance electrode with the self capacitance electrodes is performed by laser welding.

19. The method of inspecting a touch display panel of claim 17, wherein cutting off the connection position between the compensating electrode and the self capacitance electrode in each overlapping region is performed by laser cutting.

20. A display device, comprising:
a frame; and
a touch display panel comprising:
an upper substrate and a lower substrate which are arranged oppositely;
a liquid crystal layer between the upper substrate and the lower substrate;
a pixel electrode and a common electrode layer which are insulated from each other; and
a plurality of wires;
wherein the common electrode layer is divided into a plurality of self capacitance electrodes, and each self capacitance electrode is connected to one of the plurality of wires;
a compensating electrode arranged in a layer different from that of the self capacitance electrodes and insulated from the self capacitance electrodes;
wherein the compensating electrode at least covers a portion of a partition gap between neighboring self capacitance electrodes;
wherein a common electrode signal is applied to the compensating electrode during a display period;
wherein the self capacitance electrodes, the wires, and the compensating electrode are arranged on a surface of one of the upper substrate and the lower substrate so that the self capacitance electrodes, the wires, and the compensating electrode face the other of the upper substrate and the lower substrate; and
wherein the compensating electrode is an integral piece, and there is an overlapping region of a predefined size between the compensating electrode and each self capacitance electrode.

* * * * *